(12) United States Patent
Moorer et al.

(10) Patent No.: US 8,210,480 B2
(45) Date of Patent: Jul. 3, 2012

(54) HYBRID ELECTROSTATIC SPACE TUG

(76) Inventors: Daniel F. Moorer, Boulder, CO (US);
Hanspeter Schaub, Golden, CO (US)

( * ) Notice: Subject to any disclaimer, the term of this patent is extended or adjusted under 35 U.S.C. 154(b) by 681 days.

(21) Appl. No.: 12/541,081

(22) Filed: Aug. 13, 2009

(65) Prior Publication Data

US 2011/0036951 A1    Feb. 17, 2011

(51) Int. Cl.
*B64G 1/10* (2006.01)
(52) U.S. Cl. ............... 244/158.6; 244/158.4; 244/158.5; 244/166; 244/172.4
(58) Field of Classification Search .... 244/158.4–158.6, 244/166, 172.4
See application file for complete search history.

(56) References Cited

U.S. PATENT DOCUMENTS

| | | | |
|---|---|---|---|
| 4,143,314 A | 3/1979 | Gruber | |
| 4,328,667 A | 5/1982 | Valentian et al. | |
| 4,825,646 A | 5/1989 | Challoner et al. | |
| 5,020,746 A | 6/1991 | Anzel | |
| 5,146,742 A | 9/1992 | Iida et al. | |
| 5,696,429 A | 12/1997 | Williamson et al. | |
| 5,826,831 A | 10/1998 | Anzel | |
| 6,036,143 A * | 3/2000 | Biber | 244/169 |
| 6,089,510 A * | 7/2000 | Villani et al. | 244/166 |
| 6,145,298 A | 11/2000 | Burton, Jr. | |
| 6,177,629 B1 * | 1/2001 | Katz | 136/244 |
| 6,266,142 B1 | 7/2001 | Junkins et al. | |
| 6,293,090 B1 | 9/2001 | Olson | |
| 6,332,590 B1 * | 12/2001 | Oh | 244/158.1 |
| 6,336,318 B1 | 1/2002 | Falce et al. | |
| 6,732,978 B2 * | 5/2004 | Ockels et al. | 244/171.1 |
| 6,844,714 B2 | 1/2005 | Balmain et al. | |
| 7,306,189 B2 | 12/2007 | Dressler | |
| 7,395,656 B2 | 7/2008 | Rooney | |
| 7,464,902 B2 * | 12/2008 | Leyre et al. | 244/173.3 |
| 7,484,690 B2 | 2/2009 | D'Ausilio et al. | |
| 2005/0073322 A1 * | 4/2005 | Hibbs et al. | 324/658 |
| 2005/0248491 A1 * | 11/2005 | Leyre et al. | 343/702 |

OTHER PUBLICATIONS

International Search Report and Written Opinion for International Application No. PCT/US2010/045189, mailed Oct. 6, 2010, 8 pages.
H. Schaub, S. R. Vadali, J. L. Junkins and K. T. Alfriend, "Spacecraft Formation Flying Control Using Mean Orbit Elements," *AAS Journal of Astronautical Sciences*, vol. 48, No. 1, pp. 69-87 (2000).
H. Schaub and K. T. Alfriend, "Impulsive Feedback Control to Establish Specific Mean Orbit Elements of Spacecraft Formations," AIAA Journal of Guidance, Navigation and Control, vol. 24, No. 4, pp. 739-745 (2001).

(Continued)

*Primary Examiner* — Tien Dinh
*Assistant Examiner* — Justin Benedik
(74) *Attorney, Agent, or Firm* — Sheridan Ross P.C.

(57) ABSTRACT

Space tug vehicles and methods for providing space tugs and moving target vehicles are provided. More particularly, a space tug utilizing electrostatic or Coulomb force for acting on target vehicles and for moving the target vehicles into new orbits or altitudes are provided. The space tug may establish an attractive electrostatic force by controlling the electrical potential of the space tug so that it is opposite the electrical potential of a target vehicle. The target vehicle may acquire an absolute electrical potential due to its interaction with the space plasma and photoelectrons or the space tug may impart additional charge to the target vehicle. After establishing the attractive electrostatic force, a propulsion system of the space tug is operated to provide thrust. Thrust is directed to change the orbit and/or position of the target vehicle that is being pulled towards the space tug by the electrostatic force.

20 Claims, 9 Drawing Sheets

OTHER PUBLICATIONS

K. T. Alfriend and H. Schaub, "Dynamics and Control of Spacecraft Formations: Challenges and Some Solutions," AAS Journal of Astronautical Sciences, vol. 48, No. 2, pp. 249-267 (2000).

K. T. Alfriend, S. R. Vadali and H. Schaub, "Formation Flying Satellites: Control by an Astrodynamicist," *Celestial Mechanics and Dynamical Astronomy*, vol. 81, Nos. 1-2, pp. 57-62 (2001).

H. Schaub and K. T. Alfriend, "Hybrid Cartesian and Orbit Element Feedback Law for Formation Flying Spacecraft," *AIAA Journal of Guidance, Navigation and Control*, vol. 25, No. 2, pp. 387-393 (2002).

H. Schaub, G. G. Parker and L. B. King, "Challenges and Prospects of Coulomb Spacecraft Formations," *AAS Journal of Astronautical Sciences*, vol. 52, Nos. 1-2, pp. 169-193 (2004).

H. Schaub, "Stabilization of Satellite Motion Relative to a Coulomb Spacecraft Formation," *AIAA Journal of Guidance, Navigation and Control*, vol. 28, No. 6, pp. 831-839 (2006).

H. Joe, H. Schaub, and G. G. Parker, "Formation Dynamics of Coulomb Satellites," 6th International Conference on Dynamics and Control of Systems and Structures in Space, Cinque Terre, Liguria, Italy, 14 pgs. (2004).

H. Schaub and M. Kim, "Differential Orbit Element Constraints for Coulomb Satellite Formations," AAS/AIAA Astrodynamics Specialist Conference, Providence, Rhode Island, Paper No. 04-5213, pp. 1-14 (2004).

G. G. Parker, C. Passerello, and H. Schaub, "Static Formation Control Using Interspacecraft Coulomb Forces," 2nd International Symposium on Formation Flying, Washington, D.C., pp. 1-8 (2004).

J. Berryman and H. Schaub, "Static Equilibrium Configurations in GEO Coulomb Spacecraft Formations," 15th AAS/AIAA Space Flight Mechanics Meeting, Copper Mountain, CO, Paper No. 05-104, pp. 1-18 (2005).

A. Natarajan and H. Schaub, "Linear Dynamics and Stability Analysis of a Two-Craft Coulomb Tether Formation," *AIAA Journal of Guidance, Navigation and Control*, vol. 29, No. 4, pp. 831-839 (2006).

H. Schaub, C. D. Hall, and J. Berryman, "Necessary Conditions for Circularly-Restricted Static Coulomb Formations," *AAS Journal of Astronautical Sciences*, vol. 54, Nos. 3-4, pp. 525-541 (2006).

J. Berryman and H. Schaub, "Analytical Charge Analysis for 2- and 3-Craft Coulomb Formations," *AIAA Journal of Guidance, Navigation and Control*, vol. 30, No. 6, pp. 1701-1710 (2007).

I. Hussein and H. Schaub, "Invariant Shape Solutions of the Spinning Three Craft Coulomb Tether Problem," *Journal of Celestial Mechanics and Dynamical Astronomy*, vol. 96, No. 2, pp. 137-157 (2006).

C. C. Romanelli, A. Natarajan, H. Schaub, G. G. Parker, and L. B. King, "Coulomb Spacecraft Voltage Study Due to Differential Orbital Perturbations," 2006 AAS/AIAA Space Flight Mechanics Meeting, Tampa Florida, Paper No. AAS 06-123, pp. 1-20 (2006).

A. Natarajan, H. Schaub, and G. G. Parker, "Reconfiguration of a Nadir-Pointing 2-Craft Coulomb Tether," *Journal of British Interplanetary Society*, vol. 60, No. 6, pp. 209-218 (2007).

G. G. Parker, H. Schaub, A. Natarajan and L. B. King "Coulomb Force Virtual Space Structures," Workshop on Innovative Systems Concepts, ESTEC, Noordwjik, The Netherlands, pp. 39-44 (2006).

G. G. Parker, L. B. King, and H. Schaub, "Charge Determination for Specified Shape Coulomb Force Virtual Structures," 47th AIAA/ASME/ASCE/Ahs/ASC Structures, Structural Dynamics, and Materials Conference, Newport, Rhode Island, Paper No. AIAA 2006-1891, pp. 1-8 (2006).

G. G. Parker, L. B. King, and H. Schaub, "Steered Spacecraft Deployment Using Interspacecraft Coulomb Forces," 2006 American Control Conference, Minneapolis, Minnesota, Paper WeC10.5 (2006).

S. Wang and H. Schaub, "One-Dimensional 3-Craft Coulomb Structure Control," 7th International Conference on Dynamics and Control of Systems and Structures in Space, Greenwich, England, 10 pgs. (2006).

A. Natarajan and H. Schaub, "Hybrid Control of Orbit Normal and Along-Track Two-Craft Coulomb Tethers," *Aerospace Science and Technology*, vol. 13, Nos. 4-5, pp. 183-191(2009).

S. Wang and H. Schaub, "Spacecraft Collision Avoidance Using Coulomb Forces With Separation Distance Feedback," 16th AAS/AIAA Space Flight Mechanics Meeting, Sedona, Arizona, Paper No. AAS 07-112, pp. 1-20 (2007).

V. Lappas, C. M. Saaj, D. Richie, M. Peck, B. Streetman, and H. Schaub, "Spacecraft Formation Flying and Reconfiguration with Electrostatic Forces," AAS/AIAA Space Flight Mechanics Meeting, Sedona, Arizona, Paper No. AAS 07-113, pp. 1-9 (2007).

H. Schaub and I. I. Hussein, "Stability and Reconfiguration Analysis of a Circularly Spinning 2-Craft Coulomb Tether," IEEE Aerospace Conference, Big Sky, MT, pp. 1-11 (2007).

C. M. Saaj, V. Lappas, D. Richie and H. Schaub, "Hybrid Propulsion using Electrostatic Forces for Spacecraft Swarms," European Control Conference, Kos, Greece, Paper WeC03.1, 8 pgs. (2007).

H. Vasavada and H. Schaub, "Analytic Solutions for Equal Mass 4-Craft Static Coulomb Formation," *Journal of Astronautical Sciences*, vol. 56, No. 1, pp. 7-40 (2008).

S. Wang and H. Schaub, "1-D Constrained Coulomb Structure Stabilization With Charge Saturation," AAS/AIAA Astrodynamics Specialist Conference, Mackinac Island, MI, Paper No. 07-267, pp. 1-18 (2007).

I. I. Hussein and H. Schaub, "Stability and Control of Relative Equilibria for the Three-Spacecraft Coulomb Tether Problem," AAS/AIAA Astrodynamics Specialist Conference, Mackinac Island, MI, Paper No. 07-269, pp. 1-19 (2007).

A. Natarajan and H. Schaub, "Orbit-Nadir Aligned Coulomb Tether Reconfiguration Analysis," 18th AAS/AIAA Space Flight Mechanics Meeting, Galveston, Texas, Paper No. 08-149, pp. 1-19 (2008).

S. Wang and H. Schaub, "Open-Loop Electrostatic Spacecraft Collision Avoidance using Patched Conics Analysis," AAS/AIAA Space Flight Mechanics Meeting, Galveston, Texas, Paper No. 08-207, pp. 1-16 (2008).

C. R. Seubert and H. Schaub, "Tethered Coulomb Structures: Prospects and Challenges," AAS F. Landis Markley Astrodynamics Symposium, Cambridge, Maryland, Paper No. 08-269, pp. 1-20 (2008).

S. Wang and H. Schaub, "Electrostatic Spacecraft Collision Avoidance Using Piece-Wise Constant Charges," AAS/AIAA Space Flight Mechanics Meeting, Savannah, Georgia, Paper No. AAS 09-184, pp. 1-20 (2009).

C. R. Seubert and H. Schaub, "One-Dimensional Test Bed for Coulomb Controlled Spacecraft," AAS/AIAA Space Flight Mechanics Meeting, Savannah, Georgia, Paper No. AAS 09-115, pp. 117 (2009).

S. Wang and H. Schaub, "Switched Lyapunov Function Based Coulomb Control of a Triangular 3-Vehicle Cluster," AAS/AIAA Astrodynamics Specialist Conference, Pittsburgh, PA, Paper No. AAS 09-391, pp. 1-20 (2009).

S. Wang and H. Schaub, "Nonlinear Coulomb Feedback Control of a Spinning Two Spacecraft Virtual Structure," AAS/AIAA Astrodynamics Specialist Conference, Pittsburgh, PA, Paper No. AAS 09-393, pp. 1-17 (2009).

C. Seubert and H. Schaub, "Closed-Loop One-Dimensional Charged Relative Motion Experiments Simulating Constrained Orbital Motion," AAS/AIAA Astrodynamics Specialist Conference, Pittsburgh, PA, Paper No. AAS 09-390, pp. 1-18 (2009).

C. M. Saaj, V. Lappas, D. Richie, V. Gazi, and H. Schaub, "Satellite Formation Flying: Robust Algorithms for Propulsion, Path Planning and Control," Submitted to the European Control Conference, Budapest, Hungary, 9 pgs. (2009).

M. Kim and H. Schaub, "Spacecraft Collision Avoidance Using Coulomb Forces with Separation Distance Feedback," *Proceedings of the Institution of Mechanical Engineers, Part G: Journal of Aerospace Engineering*, vol. 220, No. 5, pp. 463-474 (2006).

H. Schaub, G. G. Parker, and L. B. King, "Coulomb Thrusting Application Study," Technical Report, Virginia Tech, Aerospace and Ocean Engineering Department, Blacksburg, VA, Report No. A261344, 120 pgs. (2006).

L. King, G. Parker, S. Deshmukh, and J. Chong, "Spacecraft Formation-Flying Using Inter-Vehicle Coulomb Forces," Michigan Technological University, Final Report, 103 pgs. (2002).

K. Torkar et al., "Spacecraft Potential Control Aboard Equator-S as a Test for Cluster-II," *Annales Geophysicae*, vol. 17, pp. 1582-1591 (1999).

K. Torkar et al., "Spacecraft Potential Control Using Indium Ion Sources—Experience and Outlook Based on Six Years of Operation in Space," 6th Spacecraft Charging Technology Conference, AFRL-VS-TR-20001578, pp. 27-32 (2000).

H. Schaub, "Coulomb Craft Test Bed," available at http://homepage.mac.com/hanspeterschaub/work/CoulombTestbed.html, 3 pgs. (2009).

H. Schaub, "Coulomb Formation Flying," available at http://homepage.mac.com/hanspeterschaub/work/cff.html, 3 pgs. (2009).

Author Unknown, "NSTAR Ion Engine," available at http://www.boeing.com/defense-space/space/bss/factsheets/xips/nstar/ion-engine.html, 3 pgs. (2009).

W. Riedler et al., "Active Spacecraft Potential Control," *Space Science Reviews*, vol. 79, pp. 271-302 (1997).

International Preliminary Report on Pataentability for International Application No. PCT/US2010/045189, mailed Feb. 23, 2012, 7 pages.

Official Action for U.S. Appl. No. 12/820,548, mailed Jan. 6, 2012, 18 pages.

\* cited by examiner

HYBRID ELECTROSTATIC SPACE TUG

FIELD

A space tug for altering the altitude of a target vehicle is provided. More particularly, a space tug that utilizes an electrostatic force to alter the altitude of a target vehicle is provided.

BACKGROUND

The Geostationary Earth Orbit (GEO) belt is becoming very crowded with communication and science satellites. If a satellite breaks down, or reaches its end of life without exiting the GEO belt, then the satellite continues to occupy a valuable GEO slot. In addition, without further orbit control, these satellites will drift due to lunar and solar radiation disturbances, allowing them to wander the GEO belt and interfere with other satellites.

The current practice is to have a satellite at its end of life exit the GEO belt to a super-geosynchronous orbit with its remaining fuel. However, this requires that the payload of the satellite include fuel for this purpose. As a result, the mass of the satellite for a given mission is increased. In addition, older satellites may not have made provisions for achieving a super-geosynchronous orbit, or through accident or the accumulated effect of maneuvers during the satellite's lifetime, there may otherwise be insufficient fuel to place the satellite in a super-geosynchronous orbit. There also is a need to remove malfunctioning satellites or debris from desirable orbits, to allow those orbits to be occupied by functioning satellites, or to move potentially dangerous debris to safer orbits.

In order to remove defunct satellites from desirable orbits, space tugs equipped with docking hardware have been proposed. Such vehicles would operate by physically grasping and holding a target satellite, and then moving that target satellite while it is attached to the space tug. Although simple in concept, a space tug that grabs hold of a target satellite is difficult to implement. In particular, it requires that the space tug maneuver into the immediate proximity of the target vehicle. The space tug must then grab hold of some component or section of the target vehicle that is sufficiently robust to allow the space tug to pull on that component to change the altitude of the target vehicle. This process is often complicated by the rotation or spin of the target vehicle and/or other motion of the target vehicle relative to the space tug. In addition, the space tug is required to precisely maneuver itself into very close proximity to the target vehicle.

SUMMARY

Embodiments of the disclosed invention are directed to solving these and other problems and disadvantages of the prior art. In particular, embodiments of the present invention provide a space tug that uses a hybrid blend of Coulomb forces to move a target vehicle. More particularly, a space tug in accordance with embodiments of the present invention uses active charge control to create an absolute electrical potential on the space tug that is opposite the absolute electrical potential of the target vehicle, creating an attractive force between the space tug and the target vehicle. This attractive force or electrostatic tractor force allows the space tug to pull the target vehicle to a desired location or orbit.

In accordance with further embodiments of the present invention, the space tug performs active charge control by emitting charged particles to control the electrostatic potential of the space tug. For example, if the electrical potential of the space tug is required to be more negative, the active charge control system can emit positive ions. If the electrical potential of the space tug needs to be more positive, the active charge control system can emit negative electrons. The target vehicle can acquire an absolute charge due to its interaction with the space plasma and the photoelectron effect. Alternatively and in accordance with further embodiments of the present invention, the space tug can impart additional charge to the target vehicle by using a wireless charge transfer, such as charge beaming to aim the space tug charge emission at the target vehicle so that the target vehicle acquires an absolute charge. In another alternative embodiment of the present invention, the space tug can impart additional charge to the target vehicle by using a wired charge transfer, such as a tether or other wired connection. In yet another alternative embodiment of the present invention, the target vehicle can acquire an absolute charge by docking with a free flying active charging craft. In accordance with still further embodiments of the present invention, the space tug will incorporate an efficient inertial thruster system such as the electric ion propulsion system. The ion propulsion system may share components with the active charge control system. Therefore, the hybrid electrostatic space tug may utilize electrostatic forces to pull on a target vehicle and inertial thrusters to change the orbit of the two-craft (space tug and target vehicle) system.

Further embodiments of the disclosed invention comprise methods for altering the location or altitude of a target vehicle or spacecraft. These methods may include approaching the target vehicle with a space tug, and controlling the electrical potential of the space tug to establish an attractive electrostatic force or electrostatic tractor force between the space tug and the target vehicle. The method further includes applying a propulsive force after establishing the electrostatic tractor force. The method can also include maneuvering the space tug to within the vicinity of a target vehicle, determining an electrical potential of the space tug, and determining an electrical potential of the target vehicle.

Additional features and advantages of embodiments of the disclosed invention will become more readily apparent from the following description, particularly when taken together with the accompanying drawings.

DETAILED DESCRIPTION

Figure 1:
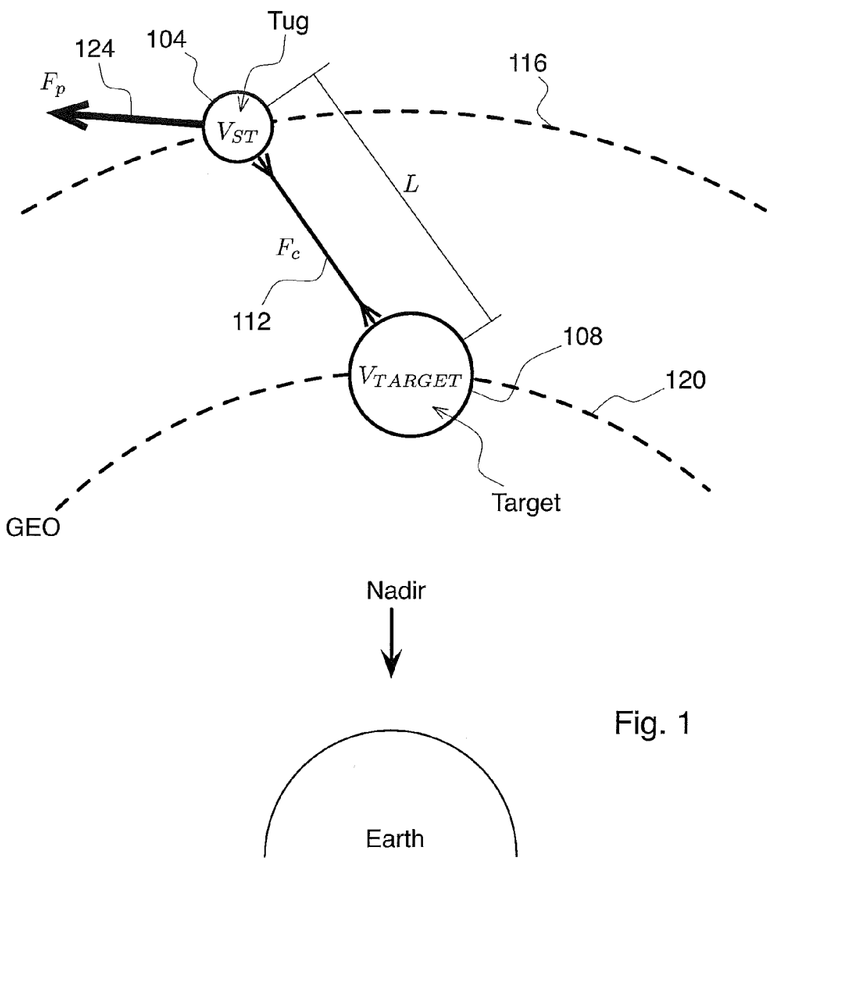
FIG. 1 depicts a relationship between a space tug and a target vehicle in accordance with embodiments of the present invention.
Figure 2:
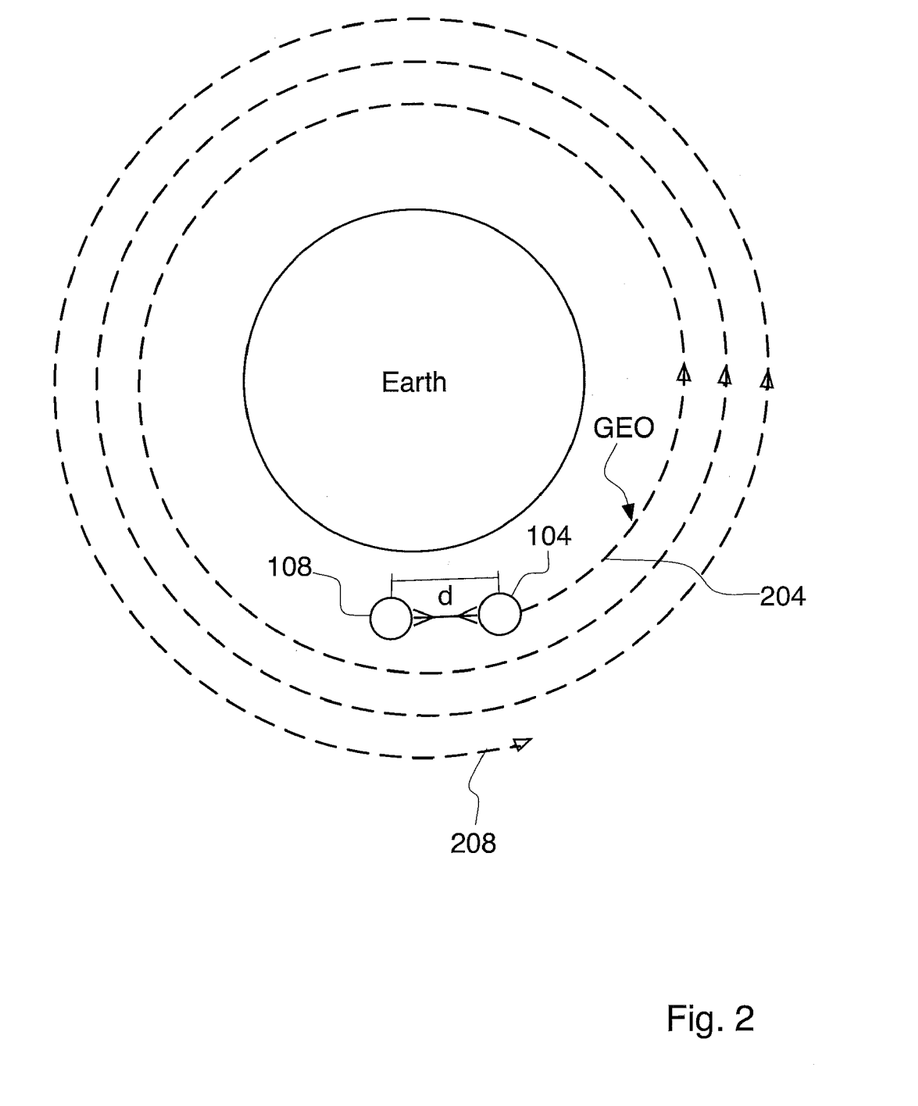
FIG. 2 depicts the transfer of a target vehicle to a new orbit using a space tug in accordance with embodiments of the present invention.

FIG. 1 depicts a space tug 104 in accordance with embodiments of the present invention, and the relationship of that space tug 104 to a target spacecraft or vehicle 108. More particularly, the space tug 104 has an electrical potential or voltage $V_{st}$ that is opposite the electrical potential or voltage $V_{target}$ of the target vehicle 108. These opposite voltages create an attractive electrostatic force or electrostatic tractor force 112 between the space tug 104 and the target vehicle 108. As shown, the space tug 104 is generally following an orbit 116 that is different than the orbit 120 of the target vehicle 108. Moreover, by applying a propulsive force $F_p$ 124, the space tug 104 can alter its orbit and the orbit of the target vehicle 108. For instance, as illustrated in FIG. 2, over a series of orbital periods, the space tug 104, applying a relatively small propulsive force $F_p$ 124, can pull the target vehicle 108 from a first orbit (e.g., a geosynchronous orbit (GEO)) 204 to a second orbit (e.g., to a super-geosynchronous orbit) 208.

In general, the magnitude of the electrostatic tractor force or Coulomb force $F_c$ 112 is given by:

$$|F_c| = k_c \frac{q_1 q_2}{L^2} e^{-\frac{L}{\lambda_d}} \left(1 + \frac{L}{\lambda_d}\right)$$

where $q_i$ is the vehicle charge level, L is the separation distance, and $\lambda_d$ is the plasma Debye length. As can be appreciated by one of skill in the art, Debye charge shielding causes the electrostatic interaction between two craft to be partially shielded due to the interaction with the local space plasma. However, at GEO, the Debye lengths average about 180 meters, with a range of between 100 and 1000 meters. Thus, a space tug 104 using active charge control as disclosed herein to establish and/or maintain an electrostatic tractor force 112 between the space tug 104 and a target vehicle 108 at ranges of, for example, 10 to 50 meters, is well within the Debye length of a charge at such altitudes.

Figure 3A:
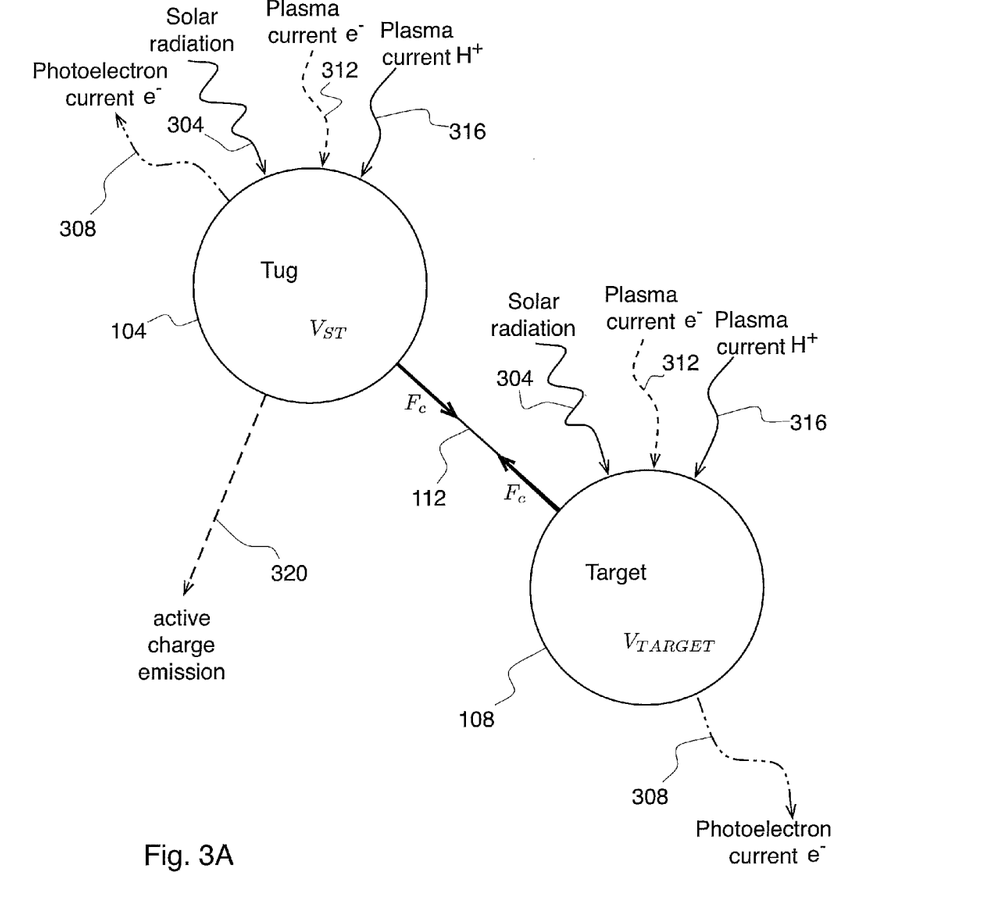
FIG. 3A depicts charge flows relative to a space tug and a target vehicle in accordance with embodiments of the present invention.

FIG. 3A depicts various charge flows with respect to the space tug 104 and the target vehicle 108. As can be appreciated by one of skill in the art, the voltage or electrical potential of the space tug 104 and the target vehicle 108 can change as a result of an imbalance in charge flows. Moreover, there typically is a floating potential at which the electron current and ion current are balanced, resulting in zero net current with respect to the vehicle under consideration. This floating potential is the value that an isolated spacecraft, such as a target vehicle 108 that is not subject to active charge control, would assume in equilibrium. Moreover, the equilibrium voltage potential of a target vehicle 108 is typically negative in shaded orbit regions, and positive in solar illuminated regions. In particular, both the space tug 104 and the target vehicle 108 are subject to solar photons 304. The photons impart a positive current by ejecting electrons from the vehicle (e.g., the space tug 104 or the target vehicle 108) subject to the solar radiation 304. The electrical potential of a vehicle such as a space tug 104 and a target vehicle 108 can also be influenced by a plasma current consisting of electrons 312 and/or a plasma current consisting of positive ions 316. The net effect of the various naturally occurring current flows can result in the subject vehicle acquiring either a positive or a negative electrical potential. Accordingly, the target vehicle can acquire or change an absolute charge due to the target vehicle's interaction with the space environment.

Figure 3B:
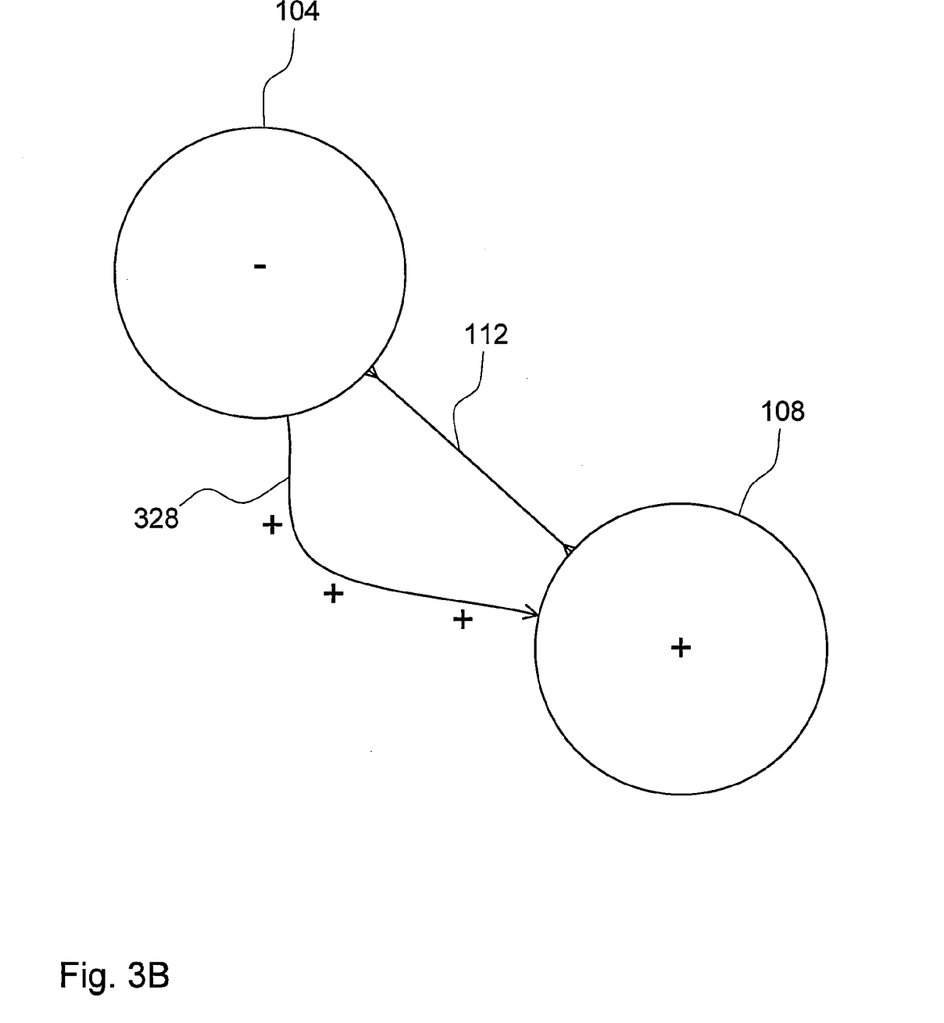
FIG. 3B depicts charge flow relative to a space tug and a target vehicle in accordance with further embodiments of the present invention.
Figure 3C:
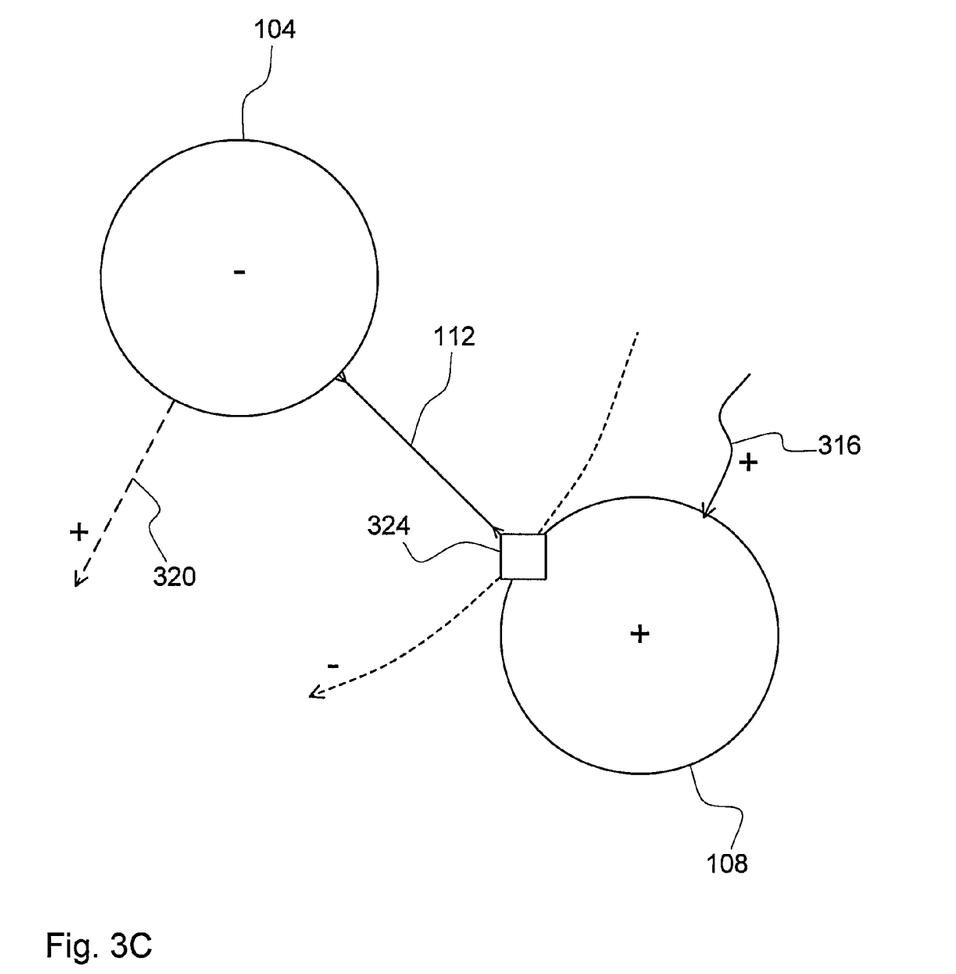
FIG. 3C depicts charge flow relative to a space tug and a target vehicle in accordance with still further embodiments of the present invention.

A space tug 104 in accordance with embodiments of the present invention includes an active charge control mechanism that is capable of producing an active charge emission current 320. The active charge emission current can include a flow of electrons, or can include a flow of positive ions. Accordingly, regardless of the voltage potential of the target vehicle 108 due to imbalances in the current flows with respect to the target vehicle 108, and the voltage potential imparted by naturally occurring current flows to the space tug 104, an active charge emission current 320 can be used to impart an electrical potential to the space tug 104 that is opposite the electrical potential of the target vehicle 108, to establish an attractive electrostatic force 112 between the space tug 104 and the target vehicle 108. In accordance with further embodiments of the present invention, the space tug can change the absolute charge of the target vehicle by imparting an additional charge to the target vehicle by using wireless or wired charge transfer mechanisms. The space tug 104 may change the absolute charge of the target vehicle by using wireless charge beaming to aim the space tug charge emission at the target vehicle so that the target vehicle changes or acquires an absolute charge. In accordance with further embodiments of the present invention, and as depicted in FIG. 3B, the space tug 104 may change the absolute charge of the target vehicle 108 by using a tether 328 or other wired connection to control the charge on the target vehicle 108. An oppositely charged space tug 104 and target vehicle 108 can be obtained by using a physically conducting wire/tether 328 that extends between the target vehicle 108 and a voltage source (not shown) provided as part of the space tug 104. In accordance with still further embodiments of the present invention, the absolute charge of the target vehicle 108 may be changed using other charge transfer mechanisms, such as by using a free flying charge control device 324. As depicted in FIG. 3C, a free flying charge control device 324 with active charge emission capability can be launched from the space tug 104 or some other platform and approach and physically dock with the target vehicle 108 in order to change the absolute potential of the target vehicle 108.

Figure 4:
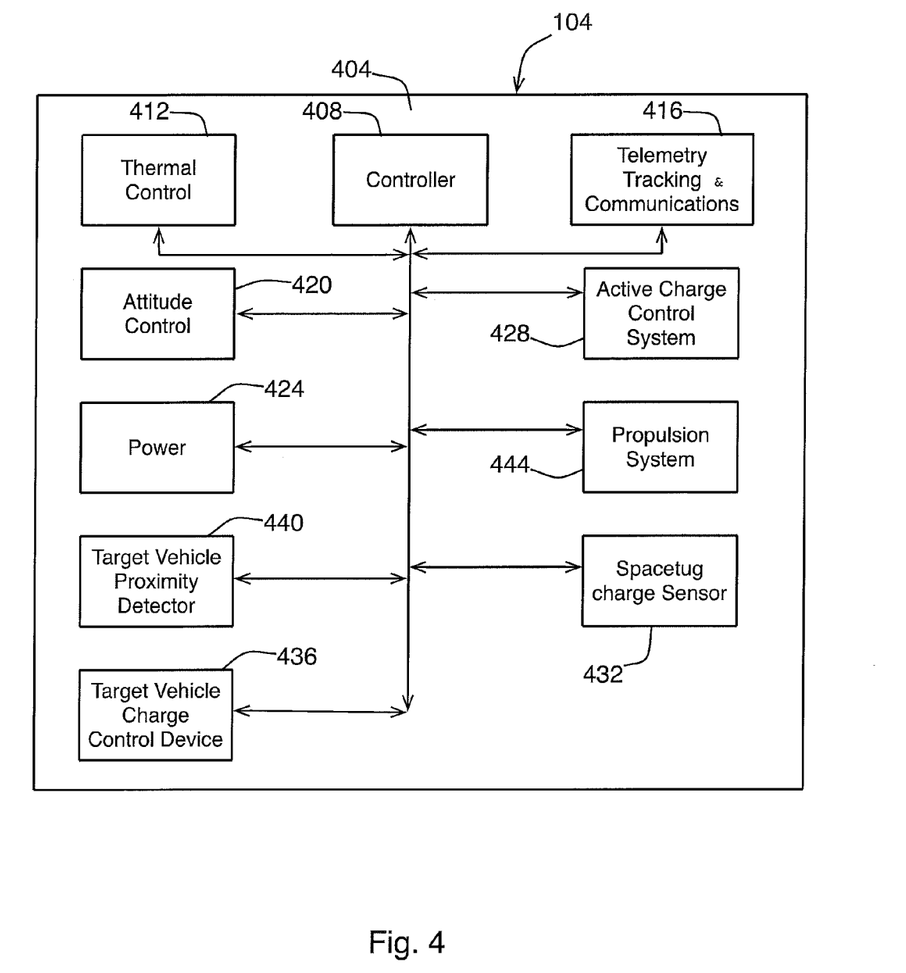
FIG. 4 depicts components of a space tug in accordance with embodiments of the present invention.

FIG. 4 depicts components of a space tug 104 in accordance with embodiments of the present invention. In general, the space tug 104 includes a vehicle bus 404, to which the various components of the space tug 104 are interconnected. For example, the space tug 104 can include components that are typical to satellites or other space vehicles generally. Examples of such components include a controller 408, a thermal control system 412, a telemetry, tracking and communications system 416, an attitude control system 420 and a power supply 424. In addition, a space tug 104 in accordance with embodiments of the present invention includes an active charge control mechanism or system 428. The space tug 104 can also include a space tug charge sensor 432, and/or a target vehicle charge control device 436. However, this is not strictly required. The Coulomb force $F_c$ is proportional to the charge product $q_1 q_2$, which can be estimated by measuring the relative motion of the vehicles. In addition, the space tug 104 may include a target vehicle proximity detector 440 that can be used to determine the relative position of a target vehicle. The electrical potential of the target spacecraft may be estimated by analyzing the local space environment. Alternatively, the polarity and charge level of the target vehicle may be estimated by determining a relative motion response from a separation distance L between the space tug and the target vehicle. The space tug 104 also includes a propulsion system 444.

As can be appreciated by one of skill in the art, the vehicle bus 404 comprises the physical or supporting structure of the space tug 104 satellite. Accordingly, the vehicle bus 404 can comprise mounting points or interconnections for various other components. The controller 408 may comprise a general purpose programmable processor, or an application specific integrated circuit (ASIC), alone or in combination with associated memory. The controller 408 may operate to control operation of the space tug 104 generally, for example by executing programming code or instructions. Moreover, the controller 408 may perform other functions, alone or in combination with various physical hardware, to provide or support for various functions performed by components of the space tug 104. The thermal control system 412 generally operates to maintain the temperature of components of the space tug 104 within an acceptable operating range. The telemetry, tracking and communication system 416 supports the provision of telemetry and location information from the space tug 104 to a ground station or another spacecraft, and to receive control information. Accordingly, the telemetry, tracking and communication system 416 may comprise provision for radio frequency and/or optical communications, and location and pose determination sensors. The power system 424 may comprise sources of electrical power, including batteries and solar panels.

The active charge control system 428 generally functions to produce an active charge emission current 320 to alter the electrical potential $V_{st}$ of the space tug 104. For example, where the electrical potential of the space tug 104 is to be made more negative (or less positive), the active charge control system 428 may operate to produce an active charge emission current 320 consisting of positively charged ions. Conversely, where the electrical potential of the space tug 104 is to be made more positive (or less negative), the active charge control system 428 may be operated to create an active charge emission current 320 consisting of negatively charged electrons.

The optional target charge control device 436 may be used to alter the electrical potential $V_{target}$ of the target vehicle 108. For example, the target charge control device 436 may include wired charge transfer devices, such as a tether 328 or other wired connection that is capable of attaching to the target vehicle 108 and altering the absolute potential of the target vehicle 108. Alternatively, the target charge control device 436 may include a free flying charge control device 324 having active charge emission capability. The free flying charge control device 324 may be operated to be deployed from the space tug 104, approach the target vehicle 108, and then dock with the target vehicle 108. Once docked or attached to the target vehicle 108, the free flying charge control device 324, can perform active charge emission to change the absolute potential of the target vehicle 108.

Figure 5:
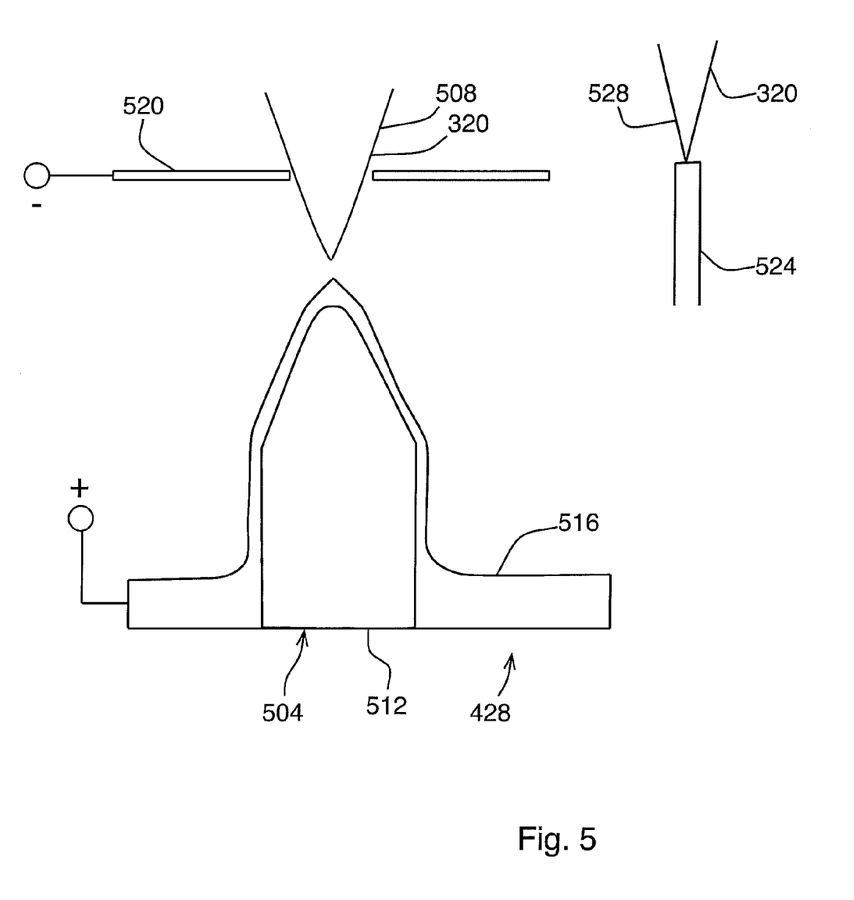
FIG. 5 depicts an active charge control system of a space tug in accordance with embodiments of the present invention.

FIG. 5 depicts components of an exemplary active charge control system 428 in accordance with embodiments of the present invention. In this exemplary embodiment, the active charge control system 428 includes an ion source 504. The ion source 504 comprises a needle type liquid metal ion source. The ion source 504 effects a positive active charge emission 320 by producing a beam of gaseous ions or an ion beam 508. More particularly, the ion source 504 includes a needle 512 mounted within a reservoir of an ion source charge material 516. The ion source charge material is placed in a molten state, with a thin film of the ion source charge material coating the needle 512. A relatively high voltage (e.g., about 6 kV) is applied between the liquid ion source charge material 516 and an accelerator electrode 520. At the tip of the needle 512, the local electric field reaches values on the order of volts per nanometer, resulting in the production of the ion beam 508 that functions as the active charge emission current 320. Various materials may be used as the ion source charge material 516. One example of a suitable ion source charge material 516 is Indium.

In accordance with further embodiments of the present invention, the active charge control system 428 may additionally or alternatively include a cathode 524 for producing an active charge emission current 320 comprising a stream of electrons 528. The cathode 524 may, for example, comprise a field emission cathode.

Figure 6:
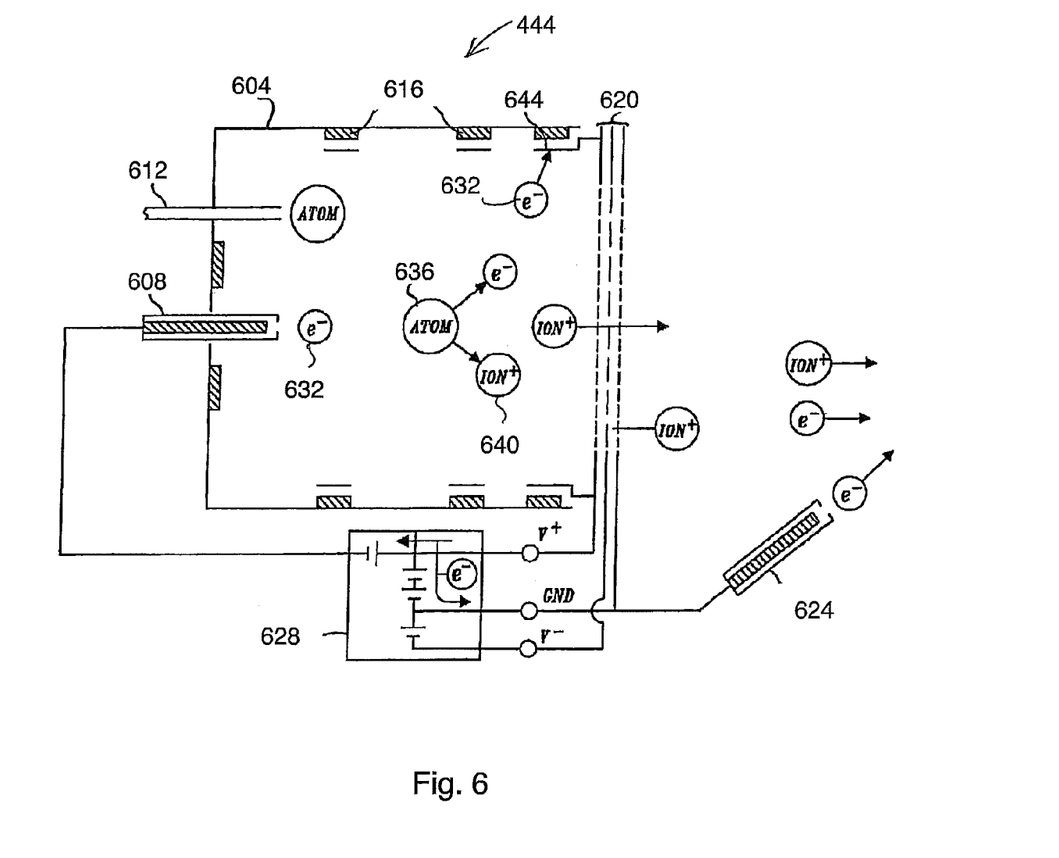
FIG. 6 depicts a propulsion system of a space tug in accordance with embodiments of the present invention.

FIG. 6 depicts a propulsion system 444 in accordance with embodiments of the present invention. In this exemplary embodiment, the propulsion system 444 is an ion engine or thruster 604. The ion engine 604 includes an impulse cathode 608, a propellant inlet 612, magnets 616, and an ion optic system 620. The ion engine 604 may additionally include a neutralizer cathode 624. The ion engine 604 may include or be associated with a power supply 628.

In operation, the impulse cathode 608 produces electrons 632 that impact atoms 636 introduced by the propellant inlet 612 to the interior of the ion engine 604. As can be appreciated by one of skill in the art, the inlet 612 receives propellant from a propellant tank (not shown). The impact of the ions 632 with the gas atoms 636 ionizes the atoms 632, producing ions 640 in a diffused plasma. An anode 644 collects electrons 632, raising the positive electrical potential of the plasma. The magnets 616 act to inhibit electrons and ions from leaving the plasma. The ions 640 are ejected from the ion engine 604 through the ion optic system 620, as a result of the voltage difference between the grids of the ion optic system 620, generating thrust. Electrons collected at the anode 644 can be injected into the ion beam exhaust of the ion engine 604 via the neutralizer cathode 624.

The optional space tug charge sensor 432 operates to determine the electrical potential of the space tug 104. While not strictly required, it can simplify the control algorithm by providing direct knowledge of the space tug charge level. Various devices or device configurations may be used in implementing the space tug charge sensor 432. For example, the charge on an electrically isolated charge plate can be measured. In such a configuration, an externally mounted surface charge detector is used to determine the electrical potential of the exterior of the space tug 104, while an internal charge plate or monitor is used as a reference voltage. As another example, a photo-emission based charged sensor that uses the photo-emission from a photo-emitting conductive plate is used as a reference point.

A target vehicle proximity detector or sensor 440 measures the separation distance between the space tug 104 and a target vehicle 108. As an example, the target vehicle proximity detector 440 may comprise a laser range finder or light detection and ranging (LIDAR) system.

Figure 7:
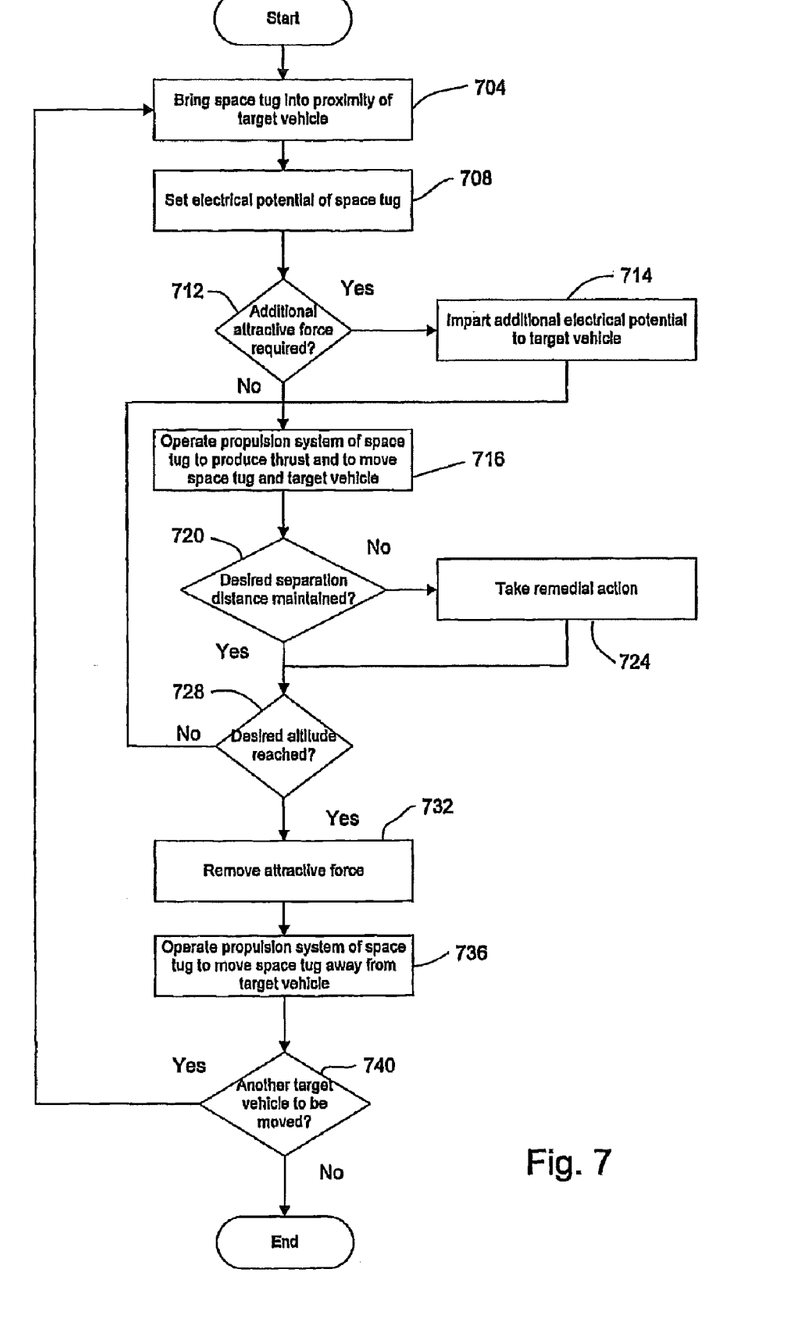
FIG. 7 is a flowchart depicting aspects of a method for altering an orbit of a target vehicle using a space tug in accordance with embodiments of the present invention.

FIG. 7 depicts aspects of a method for altering an orbit of a target vehicle using a space tug in accordance with embodiments of the present invention. Initially, the space tug is brought into proximity with the target vehicle (step 704). Bringing the space tug into the vicinity of the target vehicle can include placing the space tug into a slightly higher orbit than the target vehicle, and coming to within a range of about 10 to 50 meters of the target vehicle. In accordance with embodiments of the present invention, the space tug 104 is maneuvered into proximity with the target vehicle using the onboard propulsion system 444, which can comprise an ion engine or thruster 604. Accordingly, the space tug 104 will have already been placed into orbit, for example by a conventional chemical rocket. In addition, placing the space tug 104 into proximity with the target vehicle 108 can include obtaining range information from a target vehicle proximity detector 440, in order to determine when the space tug 104 is at a desired distance from the target vehicle 108. As can be appreciated by one of skill in the art after consideration of the present disclosure, the desired distance is one that is close enough to establish an attractive electrostatic force 112 of sufficient strength to effect the desired altitude change of the target vehicle 108, while maintaining separation between the space tug 104 and the target vehicle 108, for instance to avoid an electrostatic discharge between the vehicles 104 and 108, and to avoid direct physical contact between the vehicles 104 and 108. Placing the space tug 104 into proximity with the target vehicle 108 can additionally include operation of the telemetry, tracking and communications system 416, and the attitude control system 420, to ensure that the space tug 104 is properly aligned with respect to the target vehicle 108, and to impart a force to the target vehicle 108 in a desired direction.

At step 708, the electrical potential of the space tug 104 is set. More particularly, the electrical potential of the surface of the space tug 104 is controlled such that it is opposite the electrical potential of the target vehicle 108. For example, if the target vehicle 108 has a negative electrical potential, the active charge control system 428 may be operated to impart an overall positive electrical potential to the space tug 104. Operation of the active charge control system 428 may be in cooperation with a target vehicle proximity detector 440 that may be used to determine the relative motion of the vehicles and consequently the relative position of the target vehicle 108. That is, the target vehicle proximity detector 440 may be used to estimate the polarity and charge level of a target vehicle 108 by determining the separation distance L between the space tug 104 and the target vehicle 108 over time. In addition, a determination can be made as to whether control of the electrical potential of the space tug 104 alone will establish a sufficient attractive electrostatic force 112 between the space tug 104 and the target vehicle 108 (step 712). If an additional attractive force is required, an electrical charge can be imparted to the target vehicle 108 (step 714). For example, if the electrical potential of the target vehicle 108 is only slightly negative, it can be made more negative by directing a beam of electrons from the space tug 104 to the target vehicle 108. In particular, by directing a stream of electrons at the target vehicle 108, the target vehicle 108 will acquire a more negative charge. The stream of electrons may be supplied by a cathode, for example by a cathode provided as part of the active charge control system 428 or the propulsion system 444 of the space tug 104. At the same time, absent any counteracting current, the space tug 104 will become more positive, enhancing the attractive force 112 between the space tug 104 and the target vehicle 108. Alternatively, where the electrical potential of the target vehicle 108 is to be made more positive, a stream of ions may be directed towards the target vehicle 108. Where a beam of positively charged ions is desired, such a beam may be provided by the active charge control system 428 and/or the propulsion system 444 of the space tug 104. In another example, the target vehicle charge control device 436 may be used to change the absolute charge of the target vehicle 108. For example, the target vehicle charge control device 436 can impart an additional electrical charge to the target vehicle 108 by using a tether 328 or other wired connection or by using a non-tethered, free flying charge control device 324. As such, the target vehicle charge control device 436 may be used to control the absolute charge on the target vehicle 108 to maintain or to help maintain a desired electrostatic attractive force 112.

After controlling the electrical potential of the space tug 104, and/or imparting charge to the target vehicle 108, the propulsion system of the space tug 104 may be operated to produce thrust $F_p$ 124 (see FIG. 1) (step 716). In general, by applying thrust the altitude of the space tug 104 and the target vehicle 108 can be altered. Specifically, the thrust from the propulsion system 444 may operate on the space tug directly 404, while the thrust 124 from the propulsion system 444 may operate on the target vehicle 108 via the attractive electrostatic force 112. In accordance with embodiments of the present invention, the application of thrust using the propulsion system 444 is done in a way that increases the altitude of the space tug 104 and the target vehicle 108 gradually, such that the target vehicle 108 is brought to a desired altitude over a number of orbital periods.

At step 720, a determination is made as to whether a desired separation distance between the space tug 104 and the target vehicle 108 is being maintained. If the desired separation distance is not being maintained, remedial action can be taken (step 724). For example, the attractive electrostatic force $F_c$ 112 can be altered by altering the electrical potential of the space tug 104 and/or the target vehicle 108. Alternatively or in addition, the thrust $F_p$ 124 provided by the propulsion system 444 can be altered or discontinued.

After determining that a desired separation distance between the space tug 104 and the target vehicle 108 is being maintained, or after making adjustments or otherwise taking remedial action to maintain or reestablish a desired separation, a determination may be made as to whether the target vehicle 108 has reached the desired altitude (step 728). If the desired altitude has not been reached, the process may return to step 716. If the target vehicle 108 has reached the desired altitude, the active charge control system 428 of the space tug 104 may be operated to place the space tug 104 at or near the electrical potential of the target vehicle 108, to remove the attractive electrostatic force $F_c$ 112 (step 732). The space tug 104 can then use its propulsion system 444 to move away from the target vehicle 108 (step 736).

At step 740, a determination may be made as to whether there is another target vehicle 108 to be moved by the space tug 104. If another target vehicle 108 that needs to be moved has been identified, the process may return to step 704. If no additional target vehicles are identified, the process may end. For example, the space tug 104 can remain in orbit, until a next target vehicle 108 is identified. Although the aspects of the method discussed in connection with FIG. 7 present steps in a particular order, it should be appreciated that the illustrated exemplary order is not required. In addition, at least some of the illustrated steps can be performed continuously or during tug operations. For example, monitoring whether a desired separation distance is being maintained can be performed continuously while the space tug 104 is towing a target vehicle 108. Moreover, any necessary remedial action to maintain or reestablish a desired separation distance can be performed continuously.

Although a target vehicle 108 may comprise a defunct satellite or satellite at its end of life that is to be removed to a new orbit, embodiments of the present invention are not so limited. For example, a space tug 104 in accordance with embodiments of the present invention may be operated to reposition satellites equipped with charge control to new orbits. In addition, a target vehicle 108 is intended to include debris that is to be moved to a new orbit. For instance, pieces of a satellite that for one reason or another has broken up, or components that have served their function and are no longer operable, such as spent booster rocket sections, can be target vehicles 108 that are moved to a new orbit by a space tug 104 in accordance with embodiments of the present invention. The ability of the space tug 104 is disclosed herein to move target vehicles 108 comprising debris, even debris that is small in size but nonetheless presents a hazard to other spacecraft, highlights one of the advantages of the space tug 104 of the present invention. In particular, the ability to act on and move a target vehicle 108 without coming into direct physical contact with the target vehicle 108 allows the space tug 104 to maintain a safe separation distance from the target vehicle 108, and to operate on the target vehicle 108 even if that target vehicle 108 is in an uncontrolled spin, is devoid of features that can easily be grasped, and/or is broken into multiple pieces.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A space tug, comprising:
an active charge control system, wherein a desired surface potential of the space tug is maintained by the charge control system for at least a first time interval while the space tug is in space, wherein the desired surface potential is opposite a surface potential of a target vehicle being towed by the space tug during the first time interval, and wherein the active charge control system establishes an electrostatic attractive force between the space tug and the target vehicle;
a propulsion system, wherein a propulsive thrust is provided while the electrostatic attractive force is established to change a location of a space tug and
target vehicle formation center of mass.

2. The space tug of claim 1, wherein the active charge control system includes an ion source.

3. The space tug of claim 1, wherein the active charge control system includes an electron source.

4. The space tug of claim 1, wherein the active charge control system and the propulsion system include a shared ion source.

5. The space tug of claim 1, wherein the active charge control system and the propulsion system include a shared electron source.

6. The space tug of claim 1, wherein the active charge control system and the propulsion system include a shared ion source and a shared electron source.

7. The space tug of claim 1, wherein the active charge control system includes an ion emitter.

8. The space tug of claim 1, wherein the propulsion system includes an ion engine.

9. The space tug of claim 1, further comprising:
a space tug charge sensor, wherein the space tug charge sensor is operable to determine a potential of the space tug.

10. A method for changing an altitude of a target spacecraft, comprising:
placing a space tug into proximity with a target spacecraft;
controlling an electrical potential of the space tug, wherein the electrical potential of the space tug is set to an opposite charge from that of the target spacecraft to establish an attractive force between the space tug and the target spacecraft, wherein the attractive force is an electrostatic attractive force;
after establishing the attractive force between the space tug and the target spacecraft, applying a propulsive force, wherein the propulsive force is applied while the attractive force is established to change an altitude of the target spacecraft.

11. The method of claim 10, further comprising:
sensing an electrical potential of the space tug.

12. The method of claim 10, further comprising:
estimating an electrical potential of the target spacecraft by determining a relative motion response from a separation distance between the space tug and the target spacecraft.

13. The method of claim 10, further comprising:
changing an absolute electrical potential of the target spacecraft by controlling the charge of the target spacecraft.

14. The method of claim 10, wherein controlling an electrical potential of the space tug includes at least one of:
emitting positive ions from the space tug;
emitting negative electrons from the space tug.

15. The method of claim 10, wherein applying a propulsive force includes operating an ion engine.

16. The method of claim 10, wherein controlling an electrical potential of the space tug includes emitting positive ions from an ion emitter provided as part of the space tug, and wherein applying a propulsive force includes emitting positive ions from the ion emitter.

17. The method of claim 10, wherein the altitude of the space tug and the target spacecraft is changed to a higher altitude over a plurality of orbital periods about the Earth.

18. The method of claim 10, wherein controlling the electrical potential of the space tug includes:
sensing a potential of the space tug;
activating a charge emitter to alter the electrical potential of the space tug.

19. A space tug system, comprising:
a space tug, the space tug including:
an active charge control system;
a propulsion system; and
a target spacecraft, wherein the target spacecraft has an electrical potential, wherein the active charge control system of the space tug is operable to at least one of:
establish or maintain an electrical charge on the space tug that is opposite the electrical potential of the target spacecraft, and establish an attractive force between the space tug and the target vehicle,
wherein the propulsion system of the space tug is operable while the active charge control system is established to move a space tug and target spacecraft formation center of mass.

20. The system of claim 19, wherein the propulsion system includes an ion engine.

* * * * *